US012424405B2

(12) United States Patent
Zhong et al.

(10) Patent No.: US 12,424,405 B2
(45) Date of Patent: Sep. 23, 2025

(54) HIGH-VOLTAGE DC RELAY WITH AUXILIARY CONTACT

(71) Applicant: Xiamen Hongfa Electric Power Controls Co., Ltd., Xiamen (CN)

(72) Inventors: Shuming Zhong, Xiamen (CN); Wenguang Dai, Xiamen (CN); Meng Wang, Xiamen (CN)

(73) Assignee: XIAMEN HONGFA ELECTRIC POWER CONTROLS CO., LTD., Xiamen (CN)

( * ) Notice: Subject to any disclaimer, the term of this patent is extended or adjusted under 35 U.S.C. 154(b) by 153 days.

(21) Appl. No.: 18/033,088

(22) PCT Filed: Sep. 23, 2021

(86) PCT No.: PCT/IB2021/058671
§ 371 (c)(1),
(2) Date: Apr. 21, 2023

(87) PCT Pub. No.: WO2022/090822
PCT Pub. Date: May 5, 2022

(65) Prior Publication Data
US 2023/0395347 A1 Dec. 7, 2023

(30) Foreign Application Priority Data
Oct. 29, 2020 (CN) ......................... 202011184526.1

(51) Int. Cl.
*H01H 50/20* (2006.01)
*H01H 50/44* (2006.01)
*H01H 50/54* (2006.01)

(52) U.S. Cl.
CPC .......... *H01H 50/541* (2013.01); *H01H 50/20* (2013.01); *H01H 50/443* (2013.01)

(58) Field of Classification Search
CPC .... H01H 50/541; H01H 50/20; H01H 50/443; H01H 50/546; H01H 50/58; H01H 50/641
(Continued)

(56) References Cited

U.S. PATENT DOCUMENTS 3,226,508 A 12/1965 Morgan
3,800,250 A * 3/1974 Mori .................... H01H 50/645
335/274
(Continued)

FOREIGN PATENT DOCUMENTS

CN 201274334 Y 7/2009
CN 101677044 A 3/2010
(Continued)

OTHER PUBLICATIONS

International Search Report for corresponding application PCT/IB2021/058671 filed Sep. 23, 2021; Mail date Jan. 27, 2022.
(Continued)

*Primary Examiner* — Shawki S Ismail
*Assistant Examiner* — Lisa N Homza
(74) *Attorney, Agent, or Firm* — CANTOR COLBURN LLP

(57) ABSTRACT

A high-voltage DC relay with an auxiliary contact, includes two stationary contacts, a movable contact piece, a pushing rod, a coil assembly, a movable iron core and an auxiliary contact, the movable iron core is disposed in the coil assembly and is capable of moving up and down and is fixedly connected with the pushing rod; the movable contact piece is movably connected with the pushing rod and cooperates with the two stationary contacts; the auxiliary contact includes two auxiliary springs, each of the two auxiliary springs is provided with a lead-out pin, the pushing rod is provided with an insulating portion and a conductive
(Continued)

portion which are adjacent to each other in a vertical direction, as the pushing rod is moved up and down, the two auxiliary springs clamp the conductive portion or the insulating portion of the pushing rod to make the auxiliary contact close or open.

16 Claims, 7 Drawing Sheets

(58) Field of Classification Search
USPC .......................................................... 335/132
See application file for complete search history.

(56) References Cited

U.S. PATENT DOCUMENTS

| | | | | | |
|---|---|---|---|---|---|
| 5,245,303 | A * | 9/1993 | Aharonian | H01H 51/06 | 335/78 |
| 5,892,194 | A * | 4/1999 | Uotome | H01H 51/065 | 335/154 |
| 6,084,488 | A * | 7/2000 | Macbeth | H01H 50/546 | 335/83 |
| 7,911,301 | B2 * | 3/2011 | Yano | H01H 50/443 | 335/131 |
| 8,138,863 | B2 * | 3/2012 | Tanaka | H01H 50/38 | 335/131 |
| 8,138,872 | B2 * | 3/2012 | Yoshihara | H01H 50/36 | 335/185 |
| 8,179,217 | B2 * | 5/2012 | Kawaguchi | H01H 51/2209 | 335/85 |
| 2009/0322453 | A1 * | 12/2009 | Kawaguchi | H01F 7/1615 | 335/81 |
| 2015/0022292 | A1 * | 1/2015 | Tachikawa | H01H 50/641 | 335/131 |
| 2015/0303017 | A1 * | 10/2015 | Liang | H01H 50/047 | 335/179 |
| 2019/0074151 | A1 | 3/2019 | Huang et al. | | |
| 2020/0294747 | A1 | 9/2020 | Yao et al. | | |

FOREIGN PATENT DOCUMENTS

| | | | |
|---|---|---|---|
| CN | 107871643 | A | 4/2018 |
| CN | 209029309 | U | 6/2019 |
| CN | 110211845 | A | 9/2019 |
| CN | 213366486 | U | 6/2021 |
| EP | 3432336 | A1 | 1/2019 |
| GB | 191516993 | A | 12/1916 |
| JP | 2013008622 | A | 1/2013 |
| KR | 20190089443 | A | 7/2019 |
| KR | 20230043059 | A | 3/2023 |

OTHER PUBLICATIONS

Chinese Office Action for Application No. 202011184526.1, dated Nov. 26, 2024, 18 pages with English translation.
Chinese Office Action for corresponding application 202011184526.1; Report dated Jun. 13, 2025.
Korean Office Action for corresponding application 10-2023-7009859; Report dated May 16, 2025.

* cited by examiner

HIGH-VOLTAGE DC RELAY WITH AUXILIARY CONTACT

CROSS-REFERENCE TO RELATED APPLICATIONS

The present disclosure is based upon PCT Application No. PCT/IB2021/058671, filed on 23 Sep. 2021, which claims priority to Chinese patent application No. 202011184526.1, titled "High-voltage DC relay with auxiliary contact", filed on Oct. 29, 2020, the entire contents thereof are incorporated herein by reference.

TECHNICAL FIELD

The present disclosure relates to the technical field of relays, in particular to a high-voltage DC relay with an auxiliary contact.

BACKGROUND

The relay is an electronic control device, which has a control system (also called an input loop) and a controlled system (also called an output loop), and is usually used in automatic control circuits, the relay is actually a kind of "automatic switch" that uses a smaller current to control a larger current. Therefore, it plays the role of automatic adjustment, safety protection, and conversion circuit in the circuit.

High-voltage DC (Direct current) relay is a kind of relay, the high-voltage DC relay in the related art generally includes a relay housing, a movable contact piece for being in contact with two stationary contacts, a pushing rod, a movable iron core, a coil assembly, a reaction spring for resetting the movable iron core, and a contact spring for increasing the contact pressure. When the coil assembly is working, the movable iron core is moved to drive the movable contact piece moving through the pushing rod, so that the two ends of the movable contact piece are in contact with the two stationary contacts, and then the load circuit can be in a close state. In order to monitor the on/off state of the stationary contacts, some high-voltage DC relays also include auxiliary contacts. At present, the auxiliary contact of the high-voltage DC relay in the related art includes a conductive part that is relatively fixed to the pushing rod and has an upper contact, and two lower contacts located below the conductive part. Since the auxiliary contact of this high-voltage DC relay are of up and down contact type, when the pushing rod moves down to the conductive part and comes into contact with the lower contacts, the conductive part will give an upward thrust to the pushing rod, which makes the movable contact piece easier to release and bounce, thus there is a risk of reignition of the voltaic arc.

SUMMARY

The technical solutions adopted by the present disclosure to solve its technical problems are as follows: a high-voltage DC relay with an auxiliary contact, including two stationary contacts, a movable contact piece, a pushing rod, a coil assembly, a movable iron core and an auxiliary contact, the movable iron core is disposed in the coil assembly and is capable of moving up and down and is fixedly connected with the pushing rod; the movable contact piece is movably connected with the pushing rod and cooperates with the two stationary contacts; wherein the auxiliary contact includes two auxiliary springs located in the coil assembly, each of the two auxiliary springs is provided with a lead-out pin, the pushing rod is provided with an insulating portion and a conductive portion distributed up and down, as the pushing rod is moved up and down, the two auxiliary springs clamp the conductive portion or the insulating portion of the pushing rod to make the auxiliary contact close or open.

Further, the insulating portion is an insulating sleeve sleeved on an outside of a bottom of the pushing rod; or, the insulating portion is an insulating cap fixed to a bottom end of the pushing rod; or, the insulating portion is an insulating film coated on the bottom of the pushing rod.

Further, the conductive portion is integrally formed with the pushing rod.

Further, the insulating portion is located above the conductive portion, or the insulating portion is located below the conductive portion.

Further, the two auxiliary springs are both flexible springs that are elastically deformable.

Further, the tops of the two auxiliary springs are respectively provided with a bent portion, and an outer corner of the bent portion is in contact with the insulating portion or the conductive portion.

Further, the two auxiliary springs are symmetrical to each other.

Further, a metal shell is provided in the coil assembly, and the movable iron core and the two auxiliary springs are located in the metal shell; the bottom of the metal shell is provided with two through holes corresponding to lead-out pins of the two auxiliary springs one by one, and an insulating ring is respectively installed in the two through holes, the lead-out pins of the two auxiliary springs respectively pass downward through the insulating ring in a corresponding through hole.

Further, the metal shell includes a metal case with openings at both top and bottom ends and a metal sheet, the metal sheet is fixedly connected to a bottom opening of the metal case, and the two through holes are provided in the metal sheet.

Further, the on/off state of a main contact formed by the two stationary contacts and the movable contact piece is the same as or opposite to an on/off state of the auxiliary contact formed by the two auxiliary springs and the pushing rod.

The present disclosure will be further described in detail below with reference to the accompanying drawings and embodiments; However, the high-voltage DC relay with an auxiliary contact of the present disclosure is not limited to the embodiments.

DETAILED DESCRIPTION

The First Embodiment

Figure 4:
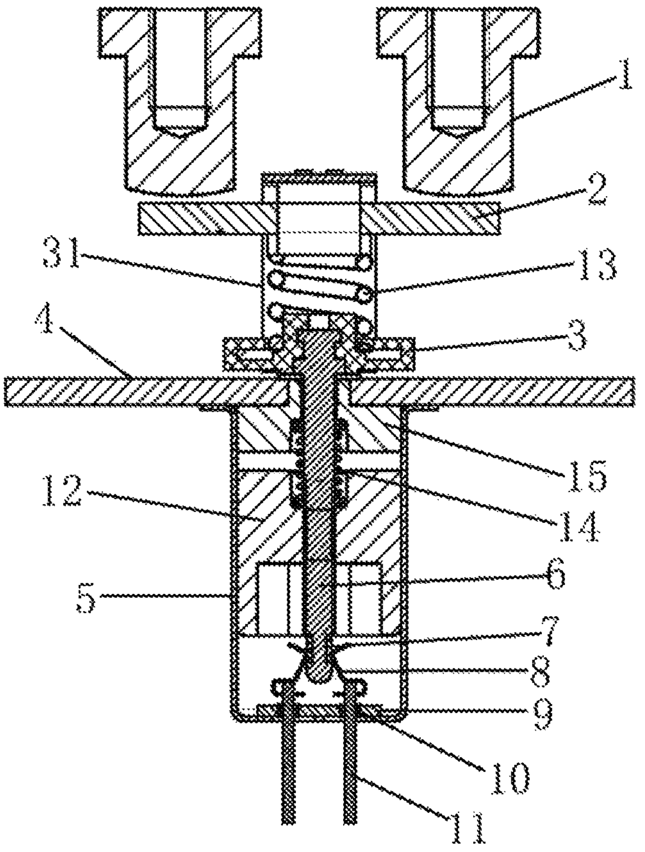
FIG. 4 is a cross-sectional view of the high-voltage DC relay in the first embodiment of the present disclosure when the main contact is in an open state.

Referring to FIGS. 1 to 5, a high-voltage DC relay with an auxiliary contact of the present disclosure includes a relay housing, two stationary contacts 1, a movable contact piece 2, a pushing rod 6, a coil assembly (not shown in the figures), a movable iron core 12, a contact spring 13, a reaction spring 14, and an auxiliary contact, the movable iron core 12 is disposed in the coil assembly and can be moved up and down, and is fixedly connected with the pushing rod 6; the movable contact piece 2 is movably connected with the pushing rod 6 and cooperates with the two stationary contacts 1. Specifically, a support 3 is provided at the upper end of the pushing rod 6, and the support 3 is connected to an inverted U-shaped part 31. The movable contact piece 2 is located in the U-shaped part 31 and the movable contact piece 2 is protruded from the two sides of the U-shaped part 31, the upper end of the contact spring 13 abuts against the movable contact piece 2, and the lower end of the contact spring 13 abuts against the support 3. The movable iron core 12 is fixedly sleeved at approximately the middle of the pushing rod 6 and is located in the coil assembly. A yoke plate 4 is provided on the top of the coil assembly, and the coil assembly is also provided with a stationary iron core 15 which is disposed above the movable iron core 12. The stationary iron core 15 is fixed to the yoke plate 4 and sleeved outside the pushing rod 6, and there is a gap between the stationary iron core 15 and the pushing rod 6. The upper end of the reaction spring 14 abuts against the stationary iron core 15, and the lower end of the reaction spring 14 abuts against the movable iron core 12. The auxiliary contact includes two auxiliary springs 8 located in the coil assembly. The two auxiliary springs 8 are respectively provided with cylindrical lead-out pins 11 that extend out of the relay housing. The bottom of the pushing rod 6 is provided with an insulating portion and a conductive portion 61 distributed up and down. As the pushing rod 6 moves up and down, the two auxiliary springs 8 clamp the conductive portion 61 or the insulating portion of the pushing rod 6 to make the auxiliary contact close or open. That is, as the pushing rod 6 moves upward, the two auxiliary springs 8 clamp one of the insulating portion and the conductive portion 61 of the pushing rod 6, as the pushing rod 6 moves downward, the two auxiliary spring 8 clamp the other of the insulating portion and the conductive portion 61 of the pushing rod 6; when the two auxiliary springs 8 clamp the conductive portion 61, the auxiliary contact is in a close state; when the two auxiliary springs 8 clamp the insulating portion, the auxiliary contact is in an open state. As shown in FIG. 4, the two auxiliary springs 8 can be symmetrical to each other.

In this embodiment, the insulating portion is an insulating sleeve 7, which is sleeved on the outside of the bottom of the pushing rod 6. Specifically, the bottom of the pushing rod 6 is provided with a necked section 63, and the insulating sleeve 7 is sleeved on the necked section 63. The conductive portion 61 is located under the insulating sleeve 7, and the conductive portion 61 is integrally formed with the pushing rod 6, and the conductive portion 61 has peripheral side surface. As shown in FIG. 4, the outer side surface of the insulating sleeve 7 and the side surface of the conductive portion 61 are substantially coplanar, so that the friction force is small when the two auxiliary springs 8 switch the clamping positions as the pushing rod moves up and down. The insulating portion is an insulating sleeve 7, which has a simple structure and convenient installation. The conductive portion 61 is directly integrally formed with the pushing rod 6, thereby avoiding additional conductive portions.

Figure 1:
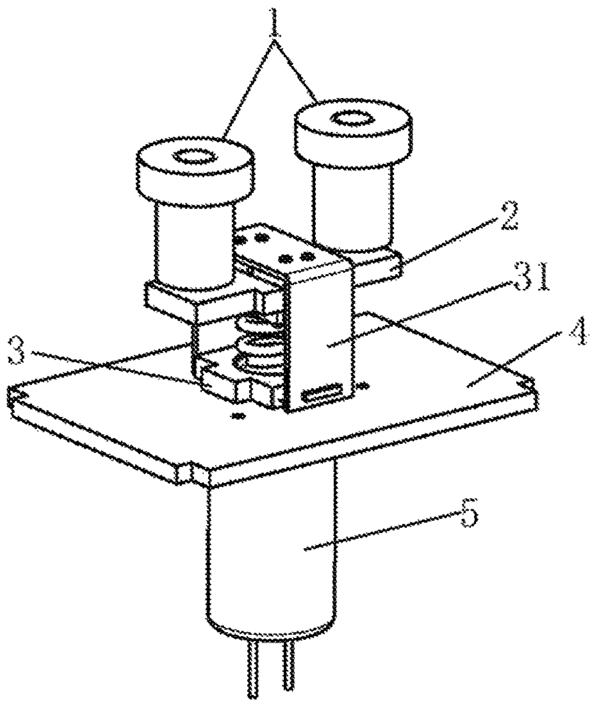
FIG. 1 is a perspective schematic diagram showing the structure of the core part of the high-voltage DC relay of the present disclosure.
Figure 2:
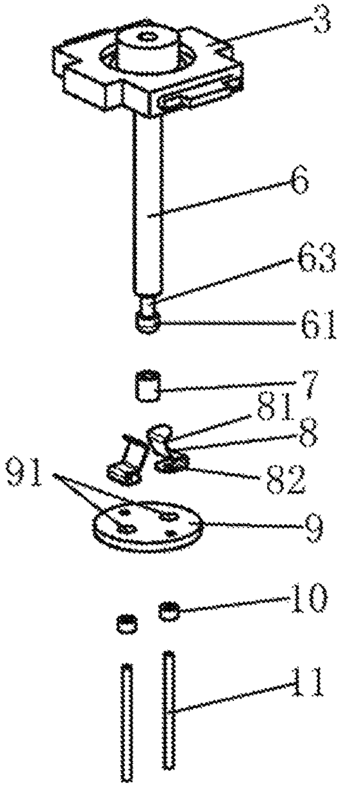
FIG. 2 is an exploded schematic diagram of the auxiliary contact part of the first embodiment of the present disclosure.
Figure 3:
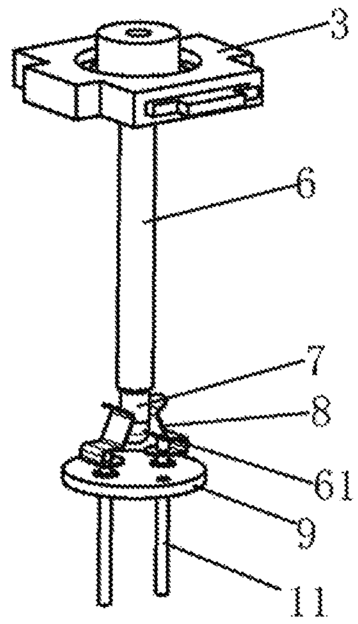
FIG. 3 is a perspective schematic diagram showing the structure of the auxiliary contact part of the first embodiment of the present disclosure.

In this embodiment, the two auxiliary springs 8 are both flexible springs that are elastically deformable. As shown in FIG. 2, the tops of the two auxiliary springs 8 are respectively provided with a bent portion 81, and the outer corner of the bent portion 81 is in contact with the insulating portion or the conductive portion 61. Each of the bottoms of the two auxiliary springs 8 is a U-shaped structure in a lying state, and the opening direction of the U-shaped structure is opposite to the direction of the bent portion 81 facing. An inserting hole 82 is provided at the lower side of the U-shaped structure, and the inserting hole 82 is inserted and fixed to the top of the lead-out pin 11. In other embodiments, the bottom of the auxiliary spring is riveted or welded to the lead-out pin. As shown in FIG. 4, each of the tops of the two auxiliary springs 8 has a V-shaped structure in a lying state. The corners of the V-shaped structure constitute the bent portion 81, and the lower side of the V-shaped structure is integrally connected with the upper side of the U-shaped structure. The two auxiliary springs 8 are both flexible springs, which not only enables the auxiliary springs 8 to have an enough clamping force and can maintain effective contact with the insulating portion or the conductive portion 61, but also achieves over-travel to ensure reliable contact between the two auxiliary springs 8 and the conductive portion 61. The tops of the two auxiliary springs 8 are respectively provided with a bent portion 81, and the outer corner of the bent portion 81 is in contact with the insulating portion or the conductive portion 61, so that when the pushing rod 6 moves up and down, the contact position of the auxiliary springs 8 and the pushing rod 6 can be switched smoothly without jamming.

In this embodiment, as shown in FIG. 4, a metal shell is provided in the coil assembly, and the movable iron core 12, the stationary iron core 15, and the two auxiliary springs 8 are located in the metal shell; the bottom of the metal shell is provided with two through holes 91 corresponding to the lead-out pins of the two auxiliary springs 8 one by one, and an insulating ring 10 is respectively installed in the two through holes 91, the lead-out pins 11 of the two auxiliary springs 8 respectively pass downward through the insulating ring 10 in the corresponding through hole 9 for connection with the external auxiliary contact monitoring circuit. The metal shell includes a metal case 5 with openings at both the top and bottom ends and a metal sheet 9. The metal sheet 9 is fixedly connected to the bottom opening of the metal case 5, and the two through holes 91 are provided in the metal sheet 9. In this way, the installation of the insulating ring 10 is more convenient. In other embodiments, the metal shell is an integrally formed structure.

In this embodiment, the relay housing includes a housing and an upper cover, a yoke part is provided in the housing, the coil assembly is arranged in the yoke part, and the upper cover is arranged at the top opening of the housing, the two stationary contacts 1 are respectively arranged in an insulating cover located on the top of the yoke part which includes an U-shaped yoke and a yoke plate and the upper ends of the two stationary contacts 1 are respectively sealed and pass through the upper cover. The structure of the relay housing is not limited to this. In other embodiments, the relay housing is composed of an upper housing and a bottom plate, or two upper and lower half-housings.

In this embodiment, the on/off state of the main contact formed by the two stationary contacts 1 and the movable contact piece 2 is the same as the on/off state of the auxiliary contact, but it is not limited to this, in other embodiments, the on/off state of the auxiliary contact can be changed by changing the position of the insulating portion (that is, the insulating sleeve 7), such as making it under the conductive portion, the on/off state of the auxiliary contact is opposite to that of the main contact.

Figure 5:
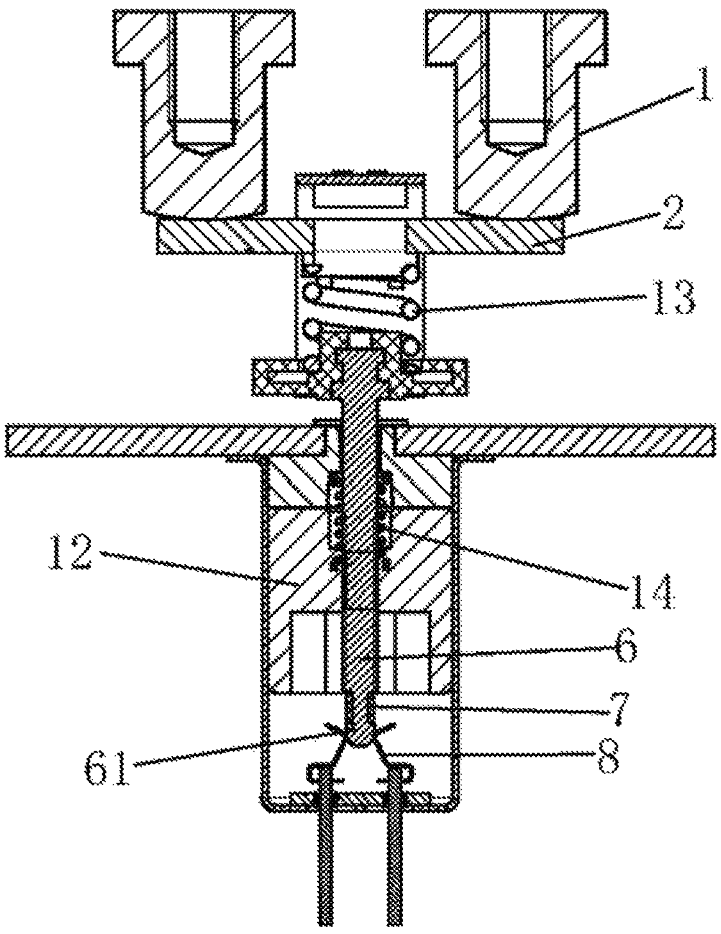
FIG. 5 is a cross-sectional view of the high-voltage DC relay in the first embodiment of the present disclosure when the main contact is in a close state.
Figure 6:
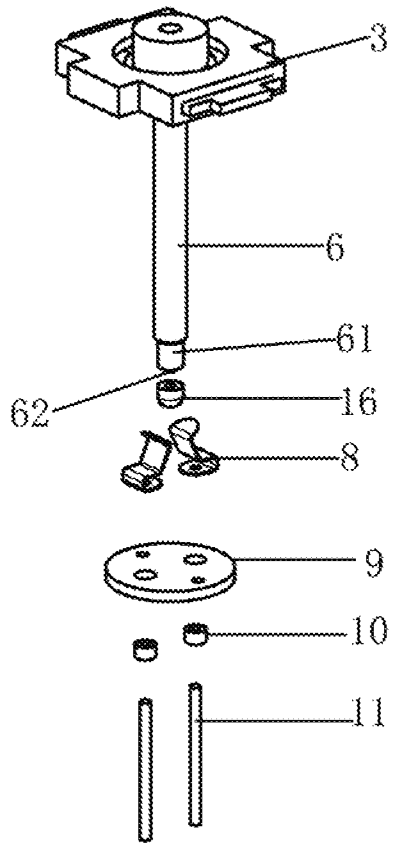
FIG. 6 is an exploded schematic diagram of the auxiliary contact part of the second embodiment of the present disclosure.
Figure 7:
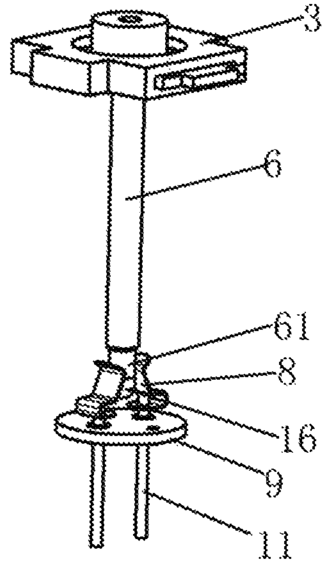
FIG. 7 is a perspective schematic diagram showing the structure of the auxiliary contact part of the second embodiment of the present disclosure.

The working principle of the high-voltage DC relay with an auxiliary contact of the present disclosure is as follows: in the normal state, the coil is not energized, and the movable contact piece 2 is separated from the two stationary contacts 1, that is, the main contact is in an open state, the movable iron core 12 is at the lowest position under the action of the reaction spring 14, and the tops of the two auxiliary springs 8 clamp the insulating sleeve 7 on the pushing rod 6, that is, the two auxiliary springs 8 are separated by the insulating sleeve 7, and the auxiliary contact is in an open state, as shown in FIG. 4. When the coil is energized, the movable iron core 12 moves upward under the action of the magnetic field, compresses the reaction spring 4, and drives the pushing rod 6 to move upward, as the pushing rod 6 moves upward, the movable contact piece 2 moves upward until it contacts the bottom of the two stationary contacts 1 and the contact spring 13 is compressed; at the same time, the insulating sleeve 7 on the pushing rod 6 gradually moves upward to separate from the two auxiliary springs 8, and the conductive portion 61 of the pushing rod 6 enters the clamping range of the two auxiliary springs 8 and effectively contacts the tops of the two auxiliary springs 8, that is, the auxiliary contact is turned on, as shown in FIG. 5. Therefore, the on/off state of the auxiliary contact is the same as that of the main contact, and the auxiliary contact can feed back the on/off state of the main contact of the high-voltage DC relay.

The high-voltage DC relay with an auxiliary contact of the present disclosure, the auxiliary contact includes two auxiliary springs 8, each of the two auxiliary springs 8 is provided with a lead-out pin 11, the pushing rod 6 is provided with an insulating portion and a conductive portion 61 distributed up and down, as the pushing rod 6 is moved up and down, the two auxiliary springs 8 clamp the conductive portion 61 or the insulating portion of the pushing rod 6 to make the auxiliary contact close or open, the relay can not only use the cooperation of two auxiliary springs 8 and the pushing rod 6 to realize the monitoring function of the auxiliary contact, but also can use the contact friction force generated by the two auxiliary springs 8 clamping the conductive portion or the insulating portion of the pushing rod 6 to offset the rebound force when the movable contact piece 2 is released, thereby reducing the risk of the voltaic arc reignition. Therefore, the relay of the present disclosure not only does not increase the risk of rebounding of the movable contact piece 2 caused by the movable contact piece 2 being released, but also can reduce the risk. In the present disclosure, on the bottom of the pushing rod 6, the insulating portion is adjacent to the conductive portion 61 in the vertical direction, both of which are respectively cooperated with the two auxiliary springs 8, so that it can make the auxiliary contacts normally open or normally close only to change the relative positions of the insulating portion and the conductive portion 61 on the pushing rod 6. Thereby meeting the requirements of use.

The Second Embodiment

Please refer to FIGS. 6 to 9, the present disclosure provides a high-voltage DC relay with an auxiliary contact, the difference between the relay of this embodiment and the relay of the first embodiment is: the insulating portion is an insulating cap 16 which is fixed to the bottom end of the pushing rod 6. Specifically, the bottom end of the pushing rod 6 is provided with a convex portion 62, and the convex portion 62 is fixed in the insulating cap 16. The conductive portion 61 is integrally formed with the pushing rod 6 and is located above the insulating cap 16. The conductive portion 61 has peripheral side surface, and the outer side surface of the insulating cap 16 and the side surface of the conductive portion 61 are substantially coplanar. The on/off state of the main contact formed by the two stationary contacts 1 and the movable contact piece 2 is opposite to the on/off state of the auxiliary contact formed by the two auxiliary springs 8 and the pushing rod 6. The insulating portion is an insulating cap 16, which has a simple structure and convenient installation. The conductive portion 61 is directly integrally formed with the pushing rod 6, thereby avoiding additional conductive portions.

In this embodiment, the structures of the two auxiliary springs 8 are the same as the structures of the auxiliary springs 8 described in the first embodiment, and will not be repeated here.

Figure 8:
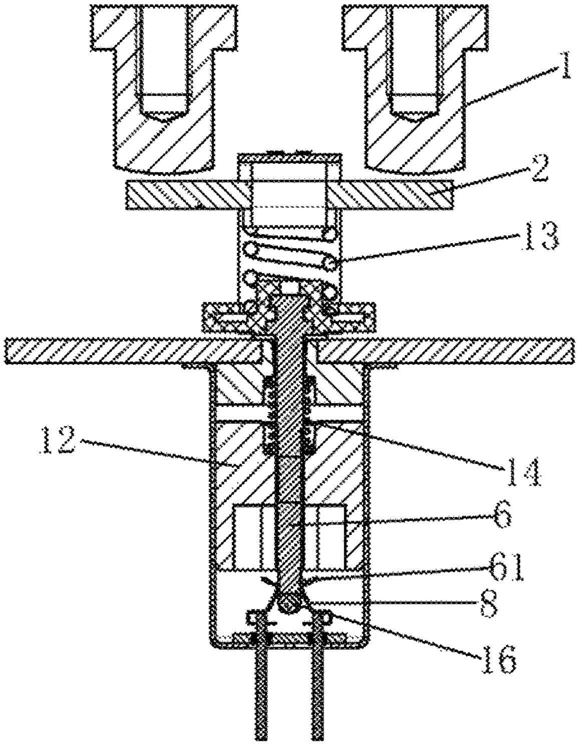
FIG. 8 is a cross-sectional view of the high-voltage DC relay in the second embodiment of the present disclosure when the main contact is in an open state.
Figure 9:
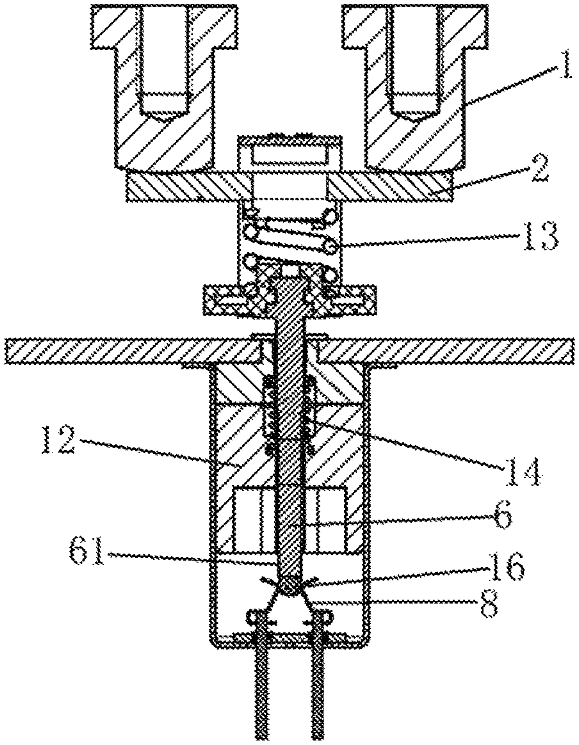
FIG. 9 is a cross-sectional view of the high-voltage DC relay in the second embodiment of the present disclosure when the main contact is in a close state.

The working principle of the high-voltage DC relay with an auxiliary contact of the present disclosure is as follows: in the normal state, the coil is not energized, and the movable contact piece 2 is separated from the two stationary contacts 1, that is, the main contact is in an open state, the movable iron core 12 is at the lowest position under the action of the reaction spring 14, and the tops of the two auxiliary springs 8 clamp the conductive portion 61 of the pushing rod 6, that is, the auxiliary contact is in a close state, as shown in FIG. 8. When the coil is energized, the movable iron core 12 moves upward under the action of the magnetic field, compresses the reaction spring 4, and drives the pushing rod 6 to move upward, as the pushing rod 6 moves upward, the movable contact piece 2 moves upward until it contacts the bottom of the two stationary contacts 1 and the contact spring 13 is compressed; at the same time, the conductive portion 61 of the pushing rod 6 gradually moves upward to separate from the two auxiliary springs 8, and the insulating cap 16 on the pushing rod 6 enters the clamping range of the two auxiliary springs 8 and effectively contacts the tops of the two auxiliary springs 8, that is, the auxiliary contact is cut off, as shown in FIG. 9. Therefore, the on/off state of the auxiliary contact is opposite to that of the main contact, and the auxiliary contact can feed back the on/off state of the main contact of the high-voltage DC relay.

The Third Embodiment

Figure 10:
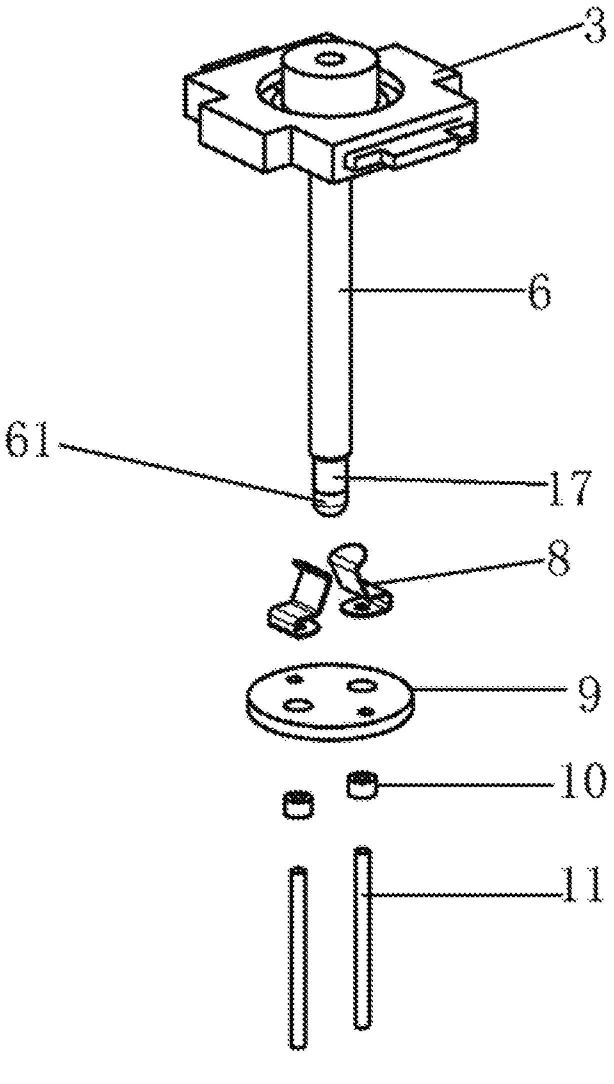
FIG. 10 is an exploded schematic diagram of the auxiliary contact part of the third embodiment of the present disclosure.

Please refer to FIG. 10, the present disclosure provides a high-voltage DC relay with an auxiliary contact, the difference between the relay of this embodiment and the relays of other embodiments is: the insulating portion is an insulating film 17 coated on the bottom of the pushing rod 6.

In this embodiment, the insulating film 17 has an annular structure and wraps around the peripheral side surface of the bottom of the pushing rod 6. The conductive portion 61 is integrally formed with the pushing rod 6 and is located under the insulating film 17, and the conductive portion 61 has peripheral side surface. The on/off state of the main contact formed by the two stationary contacts 1 and the movable contact piece 2 is same as the on/off state of the auxiliary contact formed by the two auxiliary springs 8 and the pushing rod 6. The insulating portion is an insulating film 17, which has a simple structure and convenient installation. The conductive portion 61 is directly integrally formed with the pushing rod 6, thereby avoiding additional conductive portions.

The working principle of the high-voltage DC relay with an auxiliary contact of the present disclosure is as follows: in the normal state, the coil is not energized, and the movable contact piece 2 is separated from the two stationary contacts 1, that is, the main contact is in an open state, the movable iron core 12 is at the lowest position under the action of the reaction spring 14, and the tops of the two auxiliary springs 8 clamp the insulating film 17 on the pushing rod 6, that is, the two auxiliary springs 8 are separated by the insulating film 17, and the auxiliary contact is in an open state. When the coil is energized, the movable iron core 12 moves upward under the action of the magnetic field, compresses the reaction spring 4, and drives the pushing rod 6 to move upward, as the pushing rod 6 moves upward, the movable contact piece 2 moves upward until it contacts the bottom of the two stationary contacts 1 and the contact spring 13 is compressed; at the same time, the insulating film 17 on the pushing rod 6 gradually moves upward to separate from the two auxiliary springs 8, and the conductive portion 61 of the pushing rod 6 enters the clamping range of the two auxiliary springs 8 and effectively contacts the tops of the two auxiliary springs 8, that is, the auxiliary contact is turned on. Therefore, the on/off state of the auxiliary contact is the same as that of the main contact, and the auxiliary contact can feed back the on/off state of the main contact of the high-voltage DC relay.

The Fourth Embodiment

Figure 11:
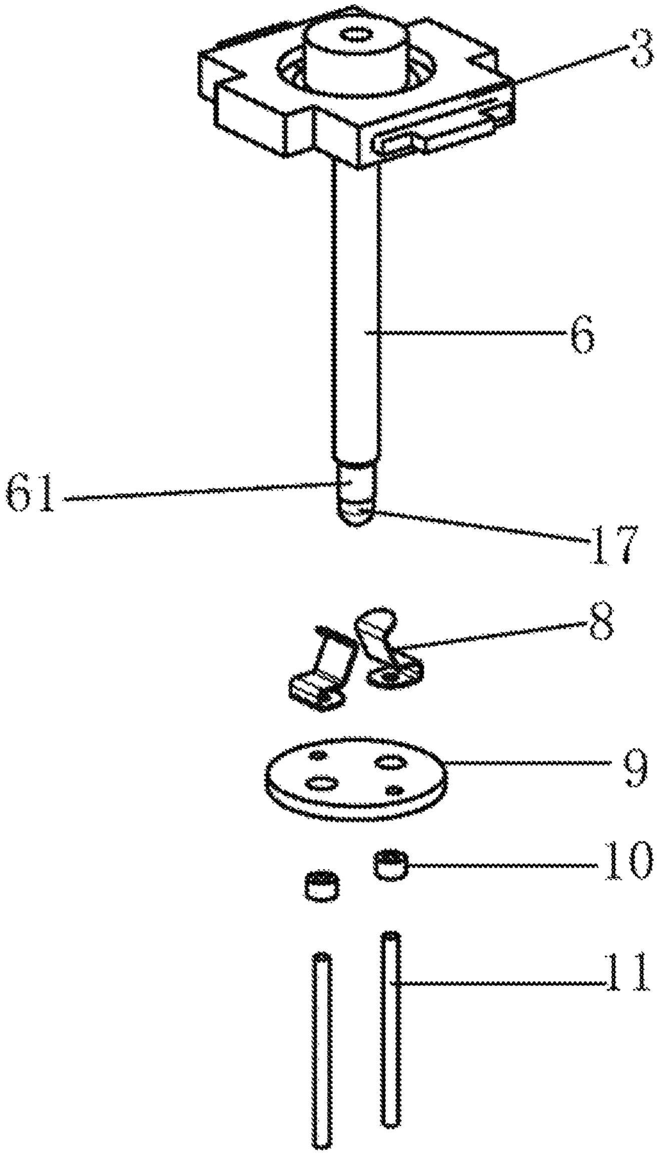
FIG. 11 is an exploded schematic diagram of the auxiliary contact part of the fourth embodiment of the present disclosure.

Please refer to FIG. 11, the present disclosure provides a high-voltage DC relay with an auxiliary contact, the difference between the relay of this embodiment and the relay of the third embodiment is: the insulating film 17 has a cap-shaped structure and wraps the bottom end surface and the peripheral side surface of the bottom of the pushing rod 6. The conductive portion 61 is integrally formed with the pushing rod 6 and is located above the insulating film 17, and the conductive portion 61 has peripheral side surface. The on/off state of the main contact formed by the two stationary contacts 1 and the movable contact piece 2 is opposite to the on/off state of the auxiliary contact formed by the two auxiliary springs 8 and the pushing rod 6.

The working principle of the high-voltage DC relay with an auxiliary contact of the present disclosure is as follows: in the normal state, the coil is not energized, and the movable contact piece 2 is separated from the two stationary contacts 1, that is, the main contact is in an open state, the movable iron core 12 is at the lowest position under the action of the reaction spring 14, and the tops of the two auxiliary springs 8 clamp the conductive portion 61 of the pushing rod 6, that is, the auxiliary contact is in an close state. When the coil is energized, the movable iron core 12 moves upward under the action of the magnetic field, compresses the reaction spring 4, and drives the pushing rod 6 to move upward, as the pushing rod 6 moves upward, the movable contact piece 2 moves upward until it contacts the bottom of the two stationary contacts 1 and the contact spring 13 is compressed; at the same time, the conductive portion 61 of the pushing rod 6 gradually moves upward to separate from the two auxiliary springs 8, and the insulating film 17 of the pushing rod 6 enters the clamping range of the two auxiliary springs 8 and effectively contacts the tops of the two auxiliary springs 8, that is, the auxiliary contact is cut off. Therefore, the on/off state of the auxiliary contact is opposite to that of the main contact, and the auxiliary contact can feed back the on/off state of the main contact of the high-voltage DC relay.

The embodiments described above are only used to further illustrate a high-voltage DC relay with auxiliary contact of the present disclosure, but the present disclosure is not limited to the embodiments. Any simple modification or equivalent of the above embodiments is made based on the technical essence of the present disclosure. The changes and modifications all fall within the protection scope of the technical solution of the present disclosure.

What is claimed is:

1. A high-voltage DC relay with an auxiliary contact, comprising two stationary contacts, a movable contact piece, a pushing rod, a coil assembly, a movable iron core and an auxiliary contact, wherein the movable iron core is disposed in the coil assembly and is capable of moving up and down and is fixedly connected with the pushing rod; the movable contact piece is movably connected with the pushing rod and cooperates with the two stationary contacts; wherein the auxiliary contact comprises two auxiliary springs located in the coil assembly, each of the two auxiliary springs is provided with a lead-out pin, the pushing rod is provided with an insulating portion and a conductive portion, the insulating portion is adjacent to the conductive portion in a vertical direction, as the pushing rod is moved up and down, the two auxiliary springs clamp the conductive portion or the insulating portion of the pushing rod to make the auxiliary contact close or open.

2. The high-voltage DC relay with an auxiliary contact according to claim 1, wherein the insulating portion is an insulating sleeve sleeved on an outside of a bottom of the pushing rod.

3. The high-voltage DC relay with an auxiliary contact according to claim 2, wherein tops of the two auxiliary springs are respectively provided with a bent portion, and an outer corner of the bent portion is in contact with the insulating portion or the conductive portion.

4. The high-voltage DC relay with an auxiliary contact according to claim 1, wherein the conductive portion is integrally formed with the pushing rod.

5. The high-voltage DC relay with an auxiliary contact according to claim 4, wherein tops of the two auxiliary springs are respectively provided with a bent portion, and an outer corner of the bent portion is in contact with the insulating portion or the conductive portion.

6. The high-voltage DC relay with an auxiliary contact according to claim 1, wherein the insulating portion is located above the conductive portion, or the insulating portion is located below the conductive portion.

7. The high-voltage DC relay with an auxiliary contact according to claim 6, wherein tops of the two auxiliary springs are respectively provided with a bent portion, and an outer corner of the bent portion is in contact with the insulating portion or the conductive portion.

8. The high-voltage DC relay with an auxiliary contact according to claim 1, wherein the two auxiliary springs are both flexible springs that are elastically deformable.

9. The high-voltage DC relay with an auxiliary contact according to claim 8, wherein tops of the two auxiliary springs are respectively provided with a bent portion, and an outer corner of the bent portion is in contact with the insulating portion or the conductive portion.

10. The high-voltage DC relay with an auxiliary contact according to claim 1, wherein tops of the two auxiliary springs are respectively provided with a bent portion, and an outer corner of the bent portion is in contact with the insulating portion or the conductive portion.

11. The high-voltage DC relay with an auxiliary contact according to claim 1, wherein the two auxiliary springs are symmetrical to each other.

12. The high-voltage DC relay with an auxiliary contact according to claim 1, wherein a metal shell is provided in the coil assembly, and the movable iron core and the two auxiliary springs are located in the metal shell; the bottom of the metal shell is provided with two through holes corresponding to lead-out pins of the two auxiliary springs one by one, and an insulating ring is respectively installed in the two through holes, the lead-out pins of the two auxiliary springs respectively pass downward through the insulating ring in a corresponding through hole.

13. The high-voltage DC relay with an auxiliary contact according to claim 12, wherein the metal shell comprises a metal case with openings at both top and bottom ends and a metal sheet, the metal sheet is fixedly connected to a bottom opening of the metal case, and the two through holes are provided in the metal sheet.

14. The high-voltage DC relay with an auxiliary contact according to claim 1, wherein an on/off state of a main contact formed by the two stationary contacts and the movable contact piece is the same as or opposite to an on/off state of the auxiliary contact.

15. The high-voltage DC relay with an auxiliary contact according to claim 1, wherein the insulating portion is an insulating cap fixed to a bottom end of the pushing rod.

16. The high-voltage DC relay with an auxiliary contact according to claim 1, wherein the insulating portion is an insulating film coated on the bottom of the pushing rod.

* * * * *